R. McINTOSH.
SHIELD FOR GAGE GLASSES.
APPLICATION FILED MAR. 20, 1913.
1,157,708.
Patented Oct. 26, 1915.
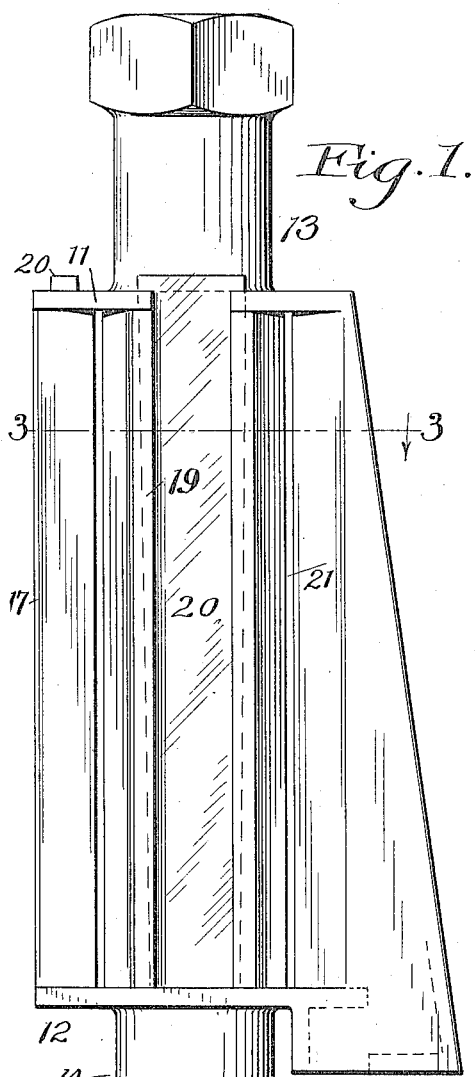
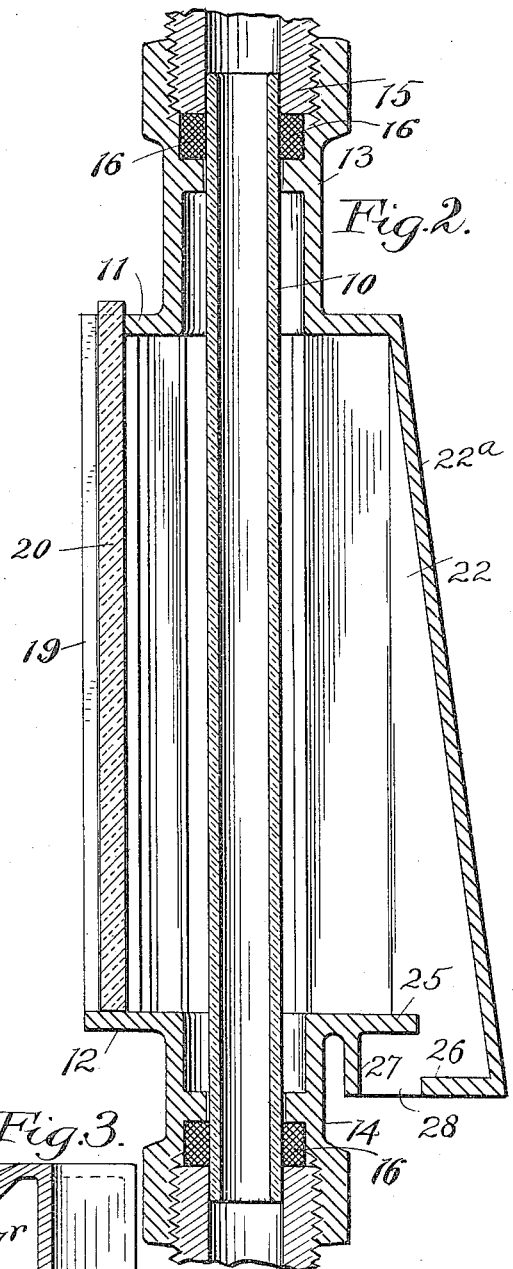
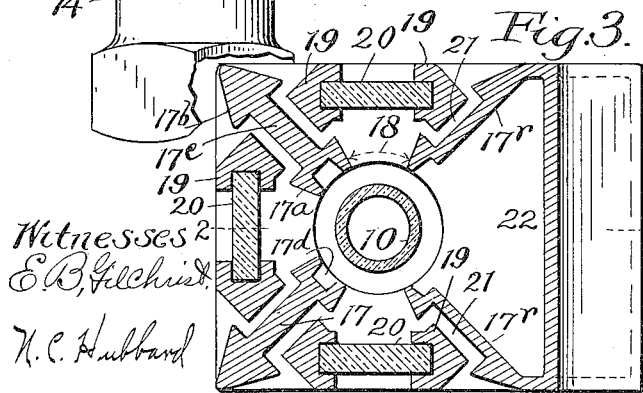

UNITED STATES PATENT OFFICE.

RALPH McINTOSH, OF CLEVELAND, OHIO.

SHIELD FOR GAGE-GLASSES.

1,157,708.  Specification of Letters Patent.  Patented Oct. 26, 1915.

Application filed March 20, 1913. Serial No. 755,574.

*To all whom it may concern:*

Be it known that I, RALPH McINTOSH, a citizen of the United States, residing at Cleveland, in the county of Cuyahoga and State of Ohio, have invented a certain new and useful Improvement in Shields for Gage-Glasses, of which the following is a full, clear, and exact description.

This invention relates to shields for water gage glasses for boilers, such as stationary, marine, or locomotive boilers, and is an improvement over the shield forming the subject matter of my prior application Serial No. 679,370, filed February 23rd 1912, for shields for water gage glasses.

In my prior application, there is disclosed a shield composed of metal guard members disposed in such a manner that when the gage glass bursts, there is minimized the liability of particles of glass, or of steam and hot water being projected outwardly through the sight slots or openings, so as to injure a person in the vicinity of the gage glass. This shield has numerous advantages, and is extremely effective for preventing injury when the gage glass bursts, but has the disadvantage that inasmuch as the shield does not embody transparent guard members through which light may pass, it is sometimes the case that when the light in the vicinity of the gage glass is not favorable, some difficulty is experienced in reading the gage or in determining the height of the water in the glass.

The present invention embodies a number of the desirable features of my prior shield, and certain improved features which overcome the difficulty above mentioned, and the invention has for its chief object to provide a shield formed partly of metal, and partly of glass, the parts being so constructed and associated that if the gage glass bursts, even at extremely high pressure, there is no danger of the glass plates forming a part of the shield being broken, as is the case with all prior shields of which I am aware.

A further object is to provide a construction wherein the pressure on the interior of the shield is relieved sufficiently when the gage glass bursts to avoid breakage of the glass plates of the shield, and wherein the major portion of the steam, broken glass, and hot water will be directed downwardly and be caused to escape from the bottom portion of the shield in such a manner that injury is not likely to result.

My invention may be briefly summarized as consisting in certain novel details of construction, and combinations and arrangements of parts which will be described in the specification and set forth in the appended claims.

In the accompanying sheets of drawings, Figure 1 is a side view of a shield constructed in accordance with the preferred form of my invention; Fig. 2 is a vertical section substantially along the line 2—2 of Fig. 3, and Fig. 3 is a transverse section substantially along the line 3—3 of Fig. 1.

Referring now to the drawings, 10 represents a gage glass which will be connected at its upper and lower ends respectively with the steam and water sides of the boiler. The gage glass is surrounded by my improved shield, the major portion of which is composed of metal parts which are preferably cast in one integral piece. I do not regard it as essential, however, that the metal portion of the shield be cast in one piece, as it may be otherwise formed, although the integral casting is preferable, as before stated. The shield casting includes an upper substantially horizontal plate 11, and a similar lower plate 12, which plates are connected together by upright guard members, to be referred to presently, and are provided respectively with upwardly and downwardly projecting tubular neck portions 13 and 14 by which connections can be made with the boiler, and into which the end portions of the gage glass project. In the present instance, the ends of the members 13 and 14 are threaded, and receive correspondingly threaded members 15, to which the pipe connections may be made. These members 15 when screwed into the threaded recesses, compress rubber washers or gaskets 16 which are squeezed very tightly against the gage glass so as to prevent leakage. These features, however, do not constitute essential parts of my invention and may be otherwise constructed.

It will be observed particularly by reference to Fig. 3, that the shield is substantially oblong in shape or rectangular in cross section. It will be seen also that provision is made for inspecting the gage glass on three sides of the shield where transparent plates or strips, preferably of plate glass, are provided, and that the rear side which would be the one adjacent the boiler head, is closed, or constitutes a closed chamber with an outlet opening at its lower end, as will be explained. Projecting radially outward with respect to the gage glass at substantially the four corners of the rectangle or oblong, are upright guard members 17 which extend vertically between the upper and lower plates 11 and 12. The inner and outer ends 17$^a$ and 17$^b$ of these radial guard members 17 are enlarged with respect to the intermediate portions 17$^c$ leaving upright rectangular slots or grooves at the sides of the portions 17$^c$, with angular shoulders at the inner and outer edges thereof. Between the inner ends of these upright guard members 17, which inner ends are rather close to the gage glass, are three upright sight slots 18, facing toward the front, and the two sides of the oblong shaped shield. The inner ends of the forward pair of these members 17 which cover or extend over arcuate spaces nearly as extensive as the width of the sight spaces or slots 18, assist in obstructing the outward passage of particles of glass, steam and water when the gage glass bursts. The shielding or guarding characteristic of the inner ends of these members is enhanced by inwardly facing slots or grooves 17$^d$.

Arranged between each pair of upright guard members 17 on the three sides of the shield mentioned, are additional upright guard members 19, which project partially into the channel shaped grooves or notches along the sides of the guard members 17, each pair of members 19 having on their adjacent faces or edges vertical slots or grooves which receive transparent protectors 20, preferably formed of plate glass. These members 19, where they project into the channel shaped side grooves of the members 17, do not contact or engage the latter at any point, thus leaving between these members sinuous vent slots 21, the primary purpose of which is to relieve the pressure, so as to protect the glass plates 20 from being broken, but at the same time prevent glass, steam or hot water from being projected outwardly so as to burn or injure a person standing in the vicinity of the gage glass. This feature has proven to be very effective for the purposes stated, and in fact I am enabled to use much thinner plate glass than has heretofore been possible to use without rendering the glass extremely liable to breakage.

Preferably, the glass strips 20 are inserted into the oppositely disposed grooves of the guard members 19 from above, the upper plate 11 being provided with openings which allow the strips to be inserted from above and slip downwardly until they rest upon the lower plate 12. In the preferable construction, the inner bases of the grooves of the members 19, in which the glass plates 20 are inserted, are on a slight taper, the space between any two of the grooves being narrower at the lower end than at the upper end of the shield, so that when the strips or plates 20 are inserted, they will be rather tightly wedged into place.

At the rear side of the shield is a vent or relief chamber 22, which includes a rear downwardly and outwardly inclined wall 22$^a$, and the two rearmost upright radial guard members here designated for convenience 17$^r$. These two members 17$^r$ although arranged substantially 90° apart, at their inner ends embrace substantially 120° of the arcuate space surrounding the gage glass. In consequence, a great deal, and in fact the major portion of the flying particles of glass and steam and water may find an outlet into this chamber. Near the lower end of this chamber, a projection of the lower plate 12 forms a rearwardly projecting shoulder 25, and at the extreme lower end of the chamber is a forwardly projecting flange or shoulder 26, and between this shoulder and a downwardly extending flange 27 is an outlet opening 28. These shoulders 25 and 26 constitute in effect baffles which break the force of the flying glass, and also of the steam and water, which pass harmlessly out of the outlet opening 28, the major portion of the gage glass which is broken into particles, being thus washed out through the outlet opening 28.

Having thus described my invention, what I claim is:

1. A shield for a gage glass comprising a pair of guard members extending outwardly with respect to the axis of the shield, a transparent plate arranged between these guard members, there being vent spaces between the plate and said guard members.

2. A shield for a gage glass comprising a pair of upright guard members, a transparent strip between the guard members, a holder therefor, there being vent spaces between the holder and the sides of the said guard members.

3. A shield for a gage glass comprising upright guard members, a transparent strip between said members, there being sinuous passageways between the edges of the strip and the guard members.

4. A shield for a gage glass comprising a pair of outwardly projecting guard members, a transparent strip between said guard members, glass holding members at the edges of the strip, said glass holding members and the said guard members having interfitting parts, and being spaced apart so that sinuous passageways are left between the same.

5. A shield for a gage glass comprising a pair of guard members having grooves in their sides, a transparent strip between said guard members and strip holding members which project into the grooves of said guard members, but are spaced therefrom, leaving between the same sinuous passageways.

6. In combination with a gage glass, a shield extending about the glass, said shield having at one side a relief chamber provided with vertically displaced staggered baffle members and with an outlet opening at the lower end of said chamber.

7. In combination with a gage glass, a shield extending about the same, said shield having at one side a relief chamber provided with a pair of shoulders displaced vertically and laterally providing an outlet opening between them.

8. In combination with a gage glass, a shield extending about the same, said shield having at one side a relief chamber having a rear wall inclined downwardly and outwardly said chamber provided with vertically displaced baffle members, and there being an outlet opening at its lower end.

In testimony whereof, I hereunto affix my signature in the presence of two witnesses.

RALPH McINTOSH.

Witnesses:
A. J. HUDSON,
A. F. KWIS.

Copies of this patent may be obtained for five cents each, by addressing the "Commissioner of Patents, Washington, D. C."